(12) United States Patent
Kamiyama

(10) Patent No.: US 7,445,029 B2
(45) Date of Patent: Nov. 4, 2008

(54) HOSE FOR WATER AND HOT WATER SUPPLY

(75) Inventor: Hidekatsu Kamiyama, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 10/515,026

(22) PCT Filed: May 21, 2003

(86) PCT No.: PCT/JP03/06310

§ 371 (c)(1),
(2), (4) Date: Nov. 22, 2004

(87) PCT Pub. No.: WO03/100308

PCT Pub. Date: Dec. 4, 2003

(65) Prior Publication Data

US 2005/0199309 A1  Sep. 15, 2005

(30) Foreign Application Priority Data

May 24, 2002  (JP) .............................. 2002-151007

(51) Int. Cl.
*F16L 11/04* (2006.01)

(52) U.S. Cl. ................... 138/127; 138/126; 138/125; 138/137; 138/141; 138/140; 428/36.91

(58) Field of Classification Search ......... 138/123–127, 138/130, 172, 174
See application file for complete search history.

(56) References Cited

U.S. PATENT DOCUMENTS

| | | | | | |
|---|---|---|---|---|---|
| 2,730,133 A | * | 1/1956 | Holland-Bowyer et al. | . | 138/127 |
| 3,866,633 A | * | 2/1975 | Taylor | ......................... | 138/130 |
| 4,259,989 A | * | 4/1981 | Lalikos et al. | ................ | 138/109 |
| 4,343,333 A | * | 8/1982 | Keister | ......................... | 138/125 |
| 4,366,746 A | * | 1/1983 | Rosecrans | ..................... | 91/467 |
| 4,384,595 A | * | 5/1983 | Washkewicz et al. | ........ | 138/127 |
| 4,431,031 A | * | 2/1984 | Ettlinger | ...................... | 138/109 |
| 4,699,178 A | * | 10/1987 | Washkewicz et al. | ........ | 138/125 |
| 4,850,395 A | * | 7/1989 | Briggs | .......................... | 138/30 |
| 5,826,623 A | * | 10/1998 | Akiyoshi et al. | ............. | 138/126 |
| 6,112,771 A | * | 9/2000 | Aoyagi et al. | ................ | 138/127 |
| 6,604,552 B2 | * | 8/2003 | Hansen et al. | ............... | 138/143 |
| 6,648,023 B2 | * | 11/2003 | Nakakita et al. | ............. | 138/127 |
| 7,114,526 B2 | * | 10/2006 | Takagi et al. | ................. | 138/127 |

FOREIGN PATENT DOCUMENTS

| | | |
|---|---|---|
| EP | 0 478 249 A2 | 4/1992 |
| EP | 0 592 732 A1 | 4/1994 |
| EP | 0 969 236 A | 1/2000 |
| EP | 1 172 593 A1 | 1/2002 |

(Continued)

*Primary Examiner*—Patrick F Brinson
(74) *Attorney, Agent, or Firm*—Sughrue Mion, PLLC

(57) ABSTRACT

A hose for feeding cold or hot water, which can be easily bent even at a small radius so that it can be applied in a small piping space, which is free of kink, and which can accommodate running water containing chlorine, is provided. The hose for feeding cold or hot water includes: an inner layer formed of an elastic tube; an inner reinforcing layer formed of a fiber yarn wound in a spiral provided on the inner layer; and an outer reinforcing layer formed of a woven metallic hard wire provided on the inner reinforcing layer.

11 Claims, 1 Drawing Sheet

FOREIGN PATENT DOCUMENTS

| | | |
|---|---|---|
| JP | 53-131523 | 11/1978 |
| JP | 56-035885 A | 4/1981 |
| JP | 63-195180 U | 12/1988 |
| JP | 1-111892 U | 7/1989 |
| JP | 09-096382 A | 4/1997 |
| JP | 09-178058 A | 7/1997 |
| JP | 10-141544 A | 5/1998 |
| JP | 11-173468 A | 6/1999 |
| JP | 11-201340 A | 7/1999 |
| JP | 11257552 A * | 9/1999 |
| JP | 11-325331 A | 11/1999 |
| JP | 2001-347569 A | 12/2001 |
| JP | 2002-168378 A | 6/2002 |
| WO | WO 99/57193 A1 | 11/1999 |

* cited by examiner

HOSE FOR WATER AND HOT WATER SUPPLY

TECHNICAL FIELD

The present invention relates to a hose for use with piping for water faucet parts at a kitchen or a wash stand, a flush tank of a toilet, or other piping for feeding cold or hot water. More particularly, the present invention relates to a hose for feeding cold or hot water, which can be easily bent even at a small radius and has no tendency of occurrence of a kink.

BACKGROUND ART

In recent years, as hoses for use with piping for a kitchen or a wash stand, a flush tank of a toilet, or other piping for feeding cold or hot water, flexible hoses are used, which include: an inner layer formed of a rubber or a thermoplastic elastomer; and a reinforcing layer thereon, which is formed by weaving, for example, a stainless steel wire, nylon, and/or a polyester fiber. Such hoses are provided with joint parts fastened by caulking at opposite ends thereof, and are referred to as "hose-type flexible expansion joints", which are used for various piping works.

However, since a space for piping work is relatively small and a length of a hose used is short, the hose-type flexible expansion joint is often forcedly bent during piping work, and/or external forces are often applied thereto from surrounding members in contact therewith.

Therefore, the hose may suffer from a kink, where a bent portion of the hose is made to be flat. When a kink occurs, a flow path of water may be blocked and a flow rate of water may be reduced. In an extreme case, water may be inhibited from flowing through the hose.

Particularly, in a case where the inner layer of the hose is formed of, for example, a polybutene resin or a cross-linking polyethylene resin in order to protect the hose-type flexible expansion joint from running water (city water) containing chlorine, the hose has a high hardness and therefore is not easily bent. Such hoses tend to suffer from kinks, and therefore, improved hoses have been desired.

DISCLOSURE OF INVENTION

Therefore, the invention is directed to provide a hose for feeding cold or hot water, which can be easily bent even at a small radius so that it can be applied in a small piping space, which is free of kinks, and which can accommodate running water containing chlorine.

The invention is made to solve the above-described problem, and relates to a hose for feeding cold or hot water, the hose including: an inner layer formed of an elastic tube; an inner reinforcing layer formed of a fiber yarn wound in a spiral provided on the inner layer; and an outer reinforcing layer formed of a woven metallic hard wire provided on the inner reinforcing layer.

It is preferable that at least an innermost surface of the inner layer in contact with cold water or hot water is formed of a polybutene resin or a cross-linking polyethylene resin in order to accommodate running water containing chlorine. The inner layer may have a single layer structure or a laminated structure. However, the inner layer preferably has a double layer structure, and an outer surface thereof is preferably formed of a polyolefine elastomer.

Further, a count of twist of the fiber yarn forming the inner reinforcing layer is preferably in a range from 0 time/10 cm to 10 times/10 cm. Furthermore, a retaining yarn layer formed of a fiber yarn is preferably provided on the inner reinforcing layer formed of the fiber yarn wound in a spiral.

Moreover, a tensile strength of the metallic hard wire forming the outer reinforcing layer is preferably in a range from 1500N/mm$^2$ to 3000N/mm$^2$, a weaving density of the metallic hard wire is preferably in a range from 15% to 55%, and a weaving angle of the metallic hard wire is preferably in a range from 54° to 70°. In addition, a covering layer made of a resin is preferably provided on the outer reinforcing layer formed of the metallic hard wire.

BEST MODE FOR CARRYING OUT THE INVENTION

Figure 1:
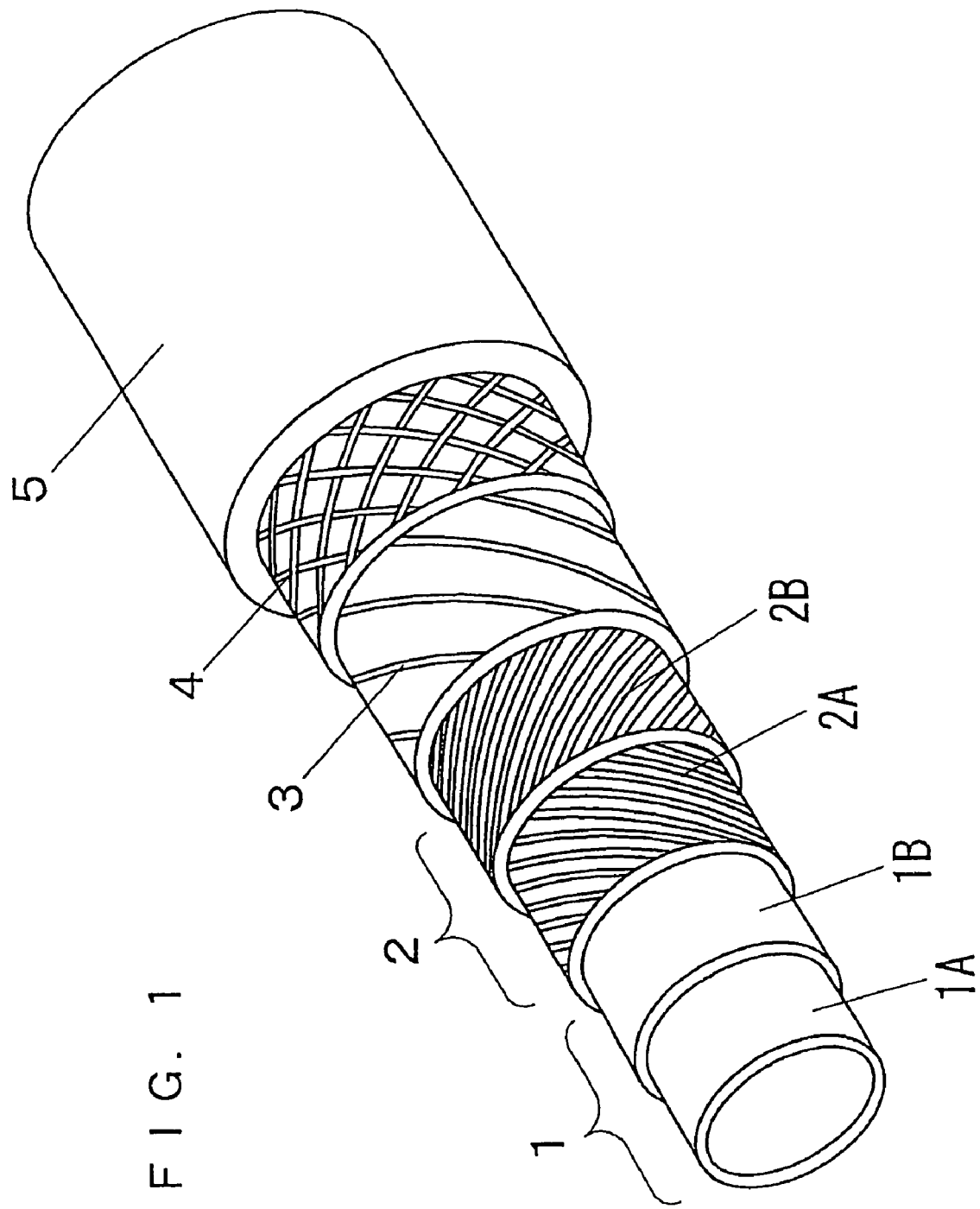
FIG. 1 is a partially sectional perspective view illustrating an example of a hose for feeding cold or hot water of the present invention.

A hose for feeding cold or hot water of the present invention includes: an inner layer formed of an elastic tube; an inner reinforcing layer on the inner layer; and an outer reinforcing layer on the inner reinforcing layer. For the tube forming the inner layer, rubber or a thermoplastic elastomer is suitably used. Particularly, where the hose is used for flowing running water, as a countermeasure against chlorine contained in running water, at least an innermost surface of the inner layer, which is in contact with cold water or hot water, is preferably formed of a polybutene resin or a cross-linking polyethylene resin.

The inner layer may have a single layer structure or a laminated structure. That is, the inner layer can be formed of a simple substance such as rubber, a polybutene resin or a cross-linking polyethylene resin, or alternatively, as a countermeasure against chlorine in running water, the inner layer may have a laminated structure, where an inner surface thereof made of rubber, or the like, is coated with a fluorine resin.

On the other hand, in a case where a polybutene resin or a cross-linking polyethylene resin is used for the inner layer, the inner layer becomes hard and is not easily bent, and tends to suffer from a kink. Considering this, the inner layer may have a laminated structure. That is, only the innermost layer of the inner layer, which is in contact with cold water or hot water, is made as a thin layer (with a thickness ranging from 0.15 mm to 0.5 mm) of a polybutene resin or a cross-linking polyethylene resin to reduce flexural rigidity, while a generally required thickness (ranging from about 1.0 mm to about 3.0 mm) for the inner layer of the hose for feeding cold or hot water is ensured by the laminated structure. In this case, the inner layer preferably has a double layer structure, where a flexible polyolefine elastomer is laminated on an outer surface of the polybutene resin or the cross-linking polyethylene resin.

Next, as a reinforcing layer, an outer reinforcing layer formed of a woven metallic hard wire is provided in the invention. Here, as for the metallic hard wire, JIS G 3502 defines piano wires, JIS G 3506 defines hard steel wire materials, and JIS G 4314 defines stainless steel wires for springs. The reason of using the metallic hard wire is to effectively prevent occurrence of a kink and to ensure pressure tightness of the hose during water flowing therethrough. In other words, even when the hose is bent so as to have a small radius, the rigidity of the metallic hard wire prevents the bent portion from being flat, and prevents the reinforcing layer from being ruptured by an inner pressure at a typical inner diameter (8 mm φ to 12 mm φ) of the hose for feeding cold or hot water.

In this sense, since a soft wire is unsuitable, the metallic hard wire is used in the invention. Specifically, a steel wire for a spring, or a stainless hard wire with consideration of preventing corrosion in a cold or hot water feeding application can be suitably used. It should be noted that a steel wire for a spring can also be prevented from corrosion by providing a covering layer formed of a resin thereon. Further, from a viewpoint of preventing external damages, it is also preferable to provide a covering layer on a stainless hard wire. As the resin for forming the covering layer, for example, a styrene thermoplastic resin or a urethane resin is suitable.

A tensile strength of the metallic hard wire forming the reinforcing layer is preferably in a range from $1500N/mm^2$ to $3000N/mm^2$. Further, a wire diameter of the metallic hard wire is preferably in a range from 0.15 mm to 0.5 mm. Although it depends on the type of the metallic hard wire, if the tensile strength is less than $1500 N/mm^2$ and/or the wire diameter is less than 0.15 mm, the rigidity of the reinforcing layer is lowered and a strength of the hose for resisting bending becomes weak. On the other hand, if the tensile strength exceeds $3000N/mm^2$ and/or the wire diameter exceeds 0.5 mm, the rigidity of the reinforcing layer impairs flexibility of the hose.

The metallic hard wire needs to be woven. It is because that if the metallic hard wire is wound in a spiral, a pitch-density thereof becomes coarse. That is, if the metallic hard wire is coarsely wound in a spiral, since it is not preferable to closely wind the metallic hard wire, considering flexibility of the hose, then, during manufacturing, when it is wound on a drum in a metallic hard wire-exposed state, the metallic hard wires of the adjacent hoses scrape against each other and positions thereof are shifted, and this impairs productivity.

Therefore, in the hose for feeding cold or hot water of the invention, the metallic hard wire is woven, and a weaving density is preferably in a range from 15% to 55%. If the weaving density is less than 15%, tendency of occurrence of kink is increased, and if the weaving density is more than 55%, the rigidity of the hose is increased and flexibility thereof is impaired.

Furthermore, a weaving angle of the metallic hard wire significantly influences on flexural rigidity and kink-resistance of the hose. Namely, a large weaving angle facilitates bending of the hose, however, if the metallic hard wire is wound (woven) closely to an extent that kink does not occur, a weaving speed is lowered and productivity is impaired. Considering a balance between productivity and properties of the hose such as flexural rigidity and kink resistance, the weaving angle is preferably in a range from 54° to 70°.

As described above, from the viewpoints of flexural rigidity and kink resistance, as well as productivity, and the like, the reinforcing layer of the hose of the invention has woven metallic hard wire structure. However, when the weaving density is coarse to some extent, a new problem of leaking out of cold water or hot water arises. That is, particularly when hot water is fed, the inner layer of the thermoplastic elastomer tends to be ruptured at clearances in the reinforcing layer, and hot water may be spewed out therefrom.

Therefore, in the hose for feeding cold or hot water of the invention, the reinforcing layer is separated into the inner reinforcing layer and the outer reinforcing layer provided on the inner reinforcing layer. Namely, the above described reinforcing layer formed of the woven metallic hard wire is the outer reinforcing layer, and the inner reinforcing layer is separately provided under the outer reinforcing layer to fill the clearances between the metallic hard wires to prevent spewing of water. The inner reinforcing layer is formed of a fiber yarn wound in a spiral on the inner layer. The reason of using the fiber yarn is to prevent spewing of water from the clearances between the metallic hard wires, while ensuring flexibility of the hose.

As the fiber yarn forming the inner reinforcing layer, a synthetic fiber such as polyester or nylon, or a vegetable fiber such as cotton can be used. In order not to increase a thickness of the hose as possible to ensure ease in handling equivalent to that of a conventional hose, a size of the fiber yarn is preferably in a range from 50 denier to 2500 denier.

Further, the fiber yarn needs to be wound in a spiral. This is because that, if the fiber yarn is closely woven, the inner reinforcing layer becomes thicker and the entire hose thickness is increased. In contrast, if the fiber yarn is coarsely woven to prevent the inner reinforcing layer from thickening, the inner layer may not withstand an inner pressure and may rupture at the clearances between the metallic hard wires of the outer reinforcing layer.

Furthermore, a count of twist of the fiber yarn is preferably in a range from 0 time/10 cm to 10 times/10 cm. Using the fiber yarn with a small count of twist, the fiber yarn having a circular sectional form becomes flat and spreads when being wound in a spiral, and thus the thin inner reinforcing layer without a clearance therebetween can be formed.

As described above, the inner reinforcing layer of the hose of the invention is formed of the fiber yarn wound in a spiral in order to prevent spewing of water while suppressing an increase in thickness. A direction of the spiral may be left or right, or may be both. However, in order to prevent the inner layer from being twisted due to a tension of the fiber yarn during manufacturing, a bi-directional spiral is preferred.

It is preferable to provide a retaining yarn layer formed of a fiber yarn on the inner reinforcing layer so that the spiral pitch thereof does not change. As the fiber yarn of the retaining yarn layer, for example, polyester can be used. The fiber yarn is coarsely wound in a spiral at an angle of friction such that the inner reinforcing layer does not shift. On the other hand, the inner layer and the inner reinforcing layer may be adhered to each other or may not be adhered to each other. That is, in view of preventing a kink, it is preferable to adhere the inner layer and the inner reinforcing layer to each other, while, in view of flexibility, it is preferable not to adhere them to each other.

EXAMPLE

Hereinafter, a specific example of a preferred embodiment of the invention is described with reference to the drawing. FIG. 1 is a partially sectional perspective view illustrating an example of the hose for feeding cold or hot water of the invention. The hose for feeding cold or hot water of the example shown in FIG. 1 includes an inner layer 1, an inner reinforcing layer 2, a retaining yarn layer 3, an outer reinforcing layer 4 and a covering layer 5 in that order from the inner side. An inner diameter of the hose is 10 mm φ and a thickness of the hose is 1.75 mm.

The inner layer 1 has a double layer structure, where an inner most surface 1A which is in contact with cold water or hot water is formed of a polybutene resin having a thickness of 0.25 mm, and a polyolefine elastomer is laminated thereon as an outer surface 1B to make a thickness of the inner layer 1 to be 1.0 mm. Therefore, the hose accommodates running water containing chlorine, and at the same time is flexible.

The inner reinforcing layer 2, which is formed of a polyester fiber yarn wound in a spiral, is provided on the inner layer 1. The inner layer 1 and the inner reinforcing layer 2 are not adhered to each other. The fiber yarn is wound respectively in left and right directions 2A and 2B at an angle of friction. A size of the fiber yarn is 1100 denier, and a count of twist thereof is as small as 3 times/10 cm. Therefore, the inner reinforcing layer 2 is not thickened, and the fiber yarn becomes flat and spreads when being wound on the inner layer 1, so that the thin inner reinforcing layer 2 without a clearance is formed.

The retaining yarn layer 3 formed of a polyester fiber yarn is provided on the inner reinforcing layer 2. The fiber yarn of the retaining yarn layer 3 is wound in a spiral only in one direction at an angle of friction, and at a coarse pitch which is sufficient for preventing position of the fiber yarn of the inner reinforcing layer 2 from shifting.

The outer reinforcing layer 4 formed of a woven stainless hard wire for a spring is provided on the retaining yarn layer 3. A diameter of the metallic hard wire is 0.29 mm, a weaving density thereof is 20%, and a weaving angle thereof is 56°. The outer reinforcing layer 4 allows the hose to be bent at a small radius without a kink.

The covering layer 5 formed of a styrene thermoplastic resin is provided on the outer reinforcing layer 4. The covering layer 5 protects the metallic hard wire forming the outer reinforcing layer 4 to prevent the metallic hard wire from being externally damaged.

INDUSTRIAL APPLICABILITY

The hose for feeding cold or hot water of the invention includes the inner layer formed of an elastic tube, the inner reinforcing layer formed of a fiber yarn wound in a spiral provided on the inner layer, and the outer reinforcing layer formed of a woven metallic hard wire provided on the inner reinforcing layer. Therefore, the hose can be easily bent even at a small radius and no king occurs. Therefore, the hose can be applied in a small piping space, ensures convenience during piping work and enhancement in durability, and has an excellent balance between productivity and properties of the hose such as flexural rigidity and kink resistance. Particularly, since the reinforcing layer is formed by combining the spiral fiber yarn and the woven metallic hard wire, no disturbance occurs in a pitch of the reinforcing layer during manufacturing, a sufficient withstanding pressure is ensured even with the thin thickness, and a strength against bending by an external force is provided while ensuring flexibility so that a necessary diameter of a water flow path is maintained.

What is claimed is:

1. A hose for feeding cold or hot water for use in piping for feeding cold or hot water, the hose comprising:
    an inner layer structured with an elastic tube wherein the inner layer has a double layer structure including an innermost layer and an outer layer;
    an inner reinforcing layer structured with a fiber yarn wound in a spiral provided on the inner layer; and
    an outer reinforcing layer structured with a woven metallic hard wire provided on the inner reinforcing layer;
    wherein the inner reinforcing layer includes two layers which are fiber yarn wound in spiral and a covering layer formed of a resin on the outer reinforcing layer;
    wherein a weaving density of the metallic hard wire forming the outer reinforcing layer is in a range from 15% to 55% and;
    wherein at least the innermost surface of the inner layer in contact with cold water or hot water is structured with a polybutene resin or a cross-linking polyethylene resin and the outer layer of the inner layer is structured with a polyolefine elastomer;
    wherein a count of twist of the fiber yarn forming the inner reinforcing layer is in a range from 0 time/10 cm to 10 times/10 cm.

2. The hose for feeding cold or hot water as claimed in claim 1, further comprising a retaining yarn layer structured with a fiber yarn on the inner reinforcing layer.

3. The hose for feeding cold or hot water as claimed in claim 1, wherein a tensile strength of the metallic hard wire forming the outer reinforcing layer is in a range from 1500N/mm$^2$ to 3000N/mm$^2$.

4. The hose for feeding cold or hot water as claimed in claim 1, wherein a weaving angle of the metallic hard wire forming the outer reinforcing layer is in a range from 54° to 70°.

5. A hose for feeding cold or hot water for use in piping for feeding cold or hot water, the hose comprising:
    an inner layer structured with an elastic tube, the inner layer having a double layer structure wherein at least an innermost layer of the inner layer including an innermost surface in contact with cold water or hot water is structured with a polybutene resin or a cross-linking polyethylene resin, and an outer layer of the inner layer is structured with a polyolefine elastomer;
    an inner reinforcing layer structured with a fiber yarn wound in a spiral provided at the outer side of the outer surface of the inner layer; and
    an outer reinforcing layer structured with a woven metallic hard wire provided at the outer side of the inner reinforcing layer; and a covering layer formed of a resin on the outer reinforcing layer;
    wherein a count of twist of the fiber yarn forming the inner reinforcing layer is in a range from 0 time/10 cm to 10 times/10 cm; and
    wherein a weaving density of the metallic hard wire forming the outer reinforcing layer is in a range from 15% to 55%.

6. The hose for feeding cold or hot water as claimed in claim 5, further comprising a retaining yarn layer structured with a fiber yarn on the inner reinforcing layer.

7. The hose for feeding cold or hot water as claimed in claim 5, wherein a tensile strength of the metallic hard wire forming the outer reinforcing layer is in a range from 1500N/mm$^2$ to 3000N/mm$^2$.

8. The hose for feeding cold or hot water as claimed in claim 5, wherein a weaving angle of the metallic hard wire forming the outer reinforcing layer is in a range from 54° to 70°.

9. The hose for feeding cold or hot water as claimed in claim 5, wherein a thickness of the innermost layer of the inner layer is smaller than a thickness of the outer layer of the inner layer.

10. The hose for feeding cold or hot water as claimed in claim 1, wherein the outer reinforcing layer is a single layer of the metallic hard wire.

11. The hose for feeding cold or hot water as claimed in claim 5, wherein the outer reinforcing layer is a single layer of the metallic hard wire.

* * * * *